US010972682B1

(12) United States Patent
Muenster et al.

(10) Patent No.: US 10,972,682 B1
(45) Date of Patent: Apr. 6, 2021

(54) SYSTEM AND METHOD FOR ADDING VIRTUAL AUDIO STICKERS TO VIDEOS

(71) Applicant: Facebook, Inc., Menlo Park, CA (US)

(72) Inventors: Natalie Muenster, Menlo Park, CA (US); Jason Stirman, Menlo Park, CA (US); Vicki Chang, Menlo Park, CA (US); Jason Toff, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/712,450

(22) Filed: Dec. 12, 2019

(51) Int. Cl.
*H04N 5/272* (2006.01)
*G11B 27/34* (2006.01)
*G11B 27/034* (2006.01)
*G11B 27/036* (2006.01)

(52) U.S. Cl.
CPC .......... *H04N 5/272* (2013.01); *G11B 27/034* (2013.01); *G11B 27/036* (2013.01); *G11B 27/34* (2013.01)

(58) Field of Classification Search
CPC .... H04N 5/272; G11B 27/034; G11B 27/036; G11B 27/34
See application file for complete search history.

(56) References Cited

U.S. PATENT DOCUMENTS

| | | | | |
|---|---|---|---|---|
| 9,807,732 | B1* | 10/2017 | Clark | H04W 24/08 |
| 10,223,593 | B1* | 3/2019 | Taylor | G06K 9/00744 |
| 2003/0089777 | A1* | 5/2003 | Rajasekharan | G11C 7/16 |
| | | | | 235/454 |
| 2015/0199024 | A1* | 7/2015 | Birnbaum | G11B 27/031 |
| | | | | 715/702 |
| 2016/0105382 | A1* | 4/2016 | Bin Mahfooz | G06F 3/04842 |
| | | | | 709/204 |
| 2016/0171357 | A1* | 6/2016 | Kwon | H04N 1/00 |
| | | | | 358/1.15 |
| 2016/0277903 | A1* | 9/2016 | Poosala | G06F 3/04842 |
| 2018/0121069 | A1 | 5/2018 | Diverdi | |
| 2018/0300037 | A1* | 10/2018 | Takeda | G06F 3/0488 |
| 2018/0336715 | A1* | 11/2018 | Rickwald | G06T 13/40 |
| 2019/0026015 | A1 | 1/2019 | Lee | |

(Continued)

FOREIGN PATENT DOCUMENTS

| | | |
|---|---|---|
| EP | 2129120 A1 | 12/2009 |
| EP | 2897026 A1 | 7/2015 |

OTHER PUBLICATIONS

Herbert, Des, "Video Editing App—VLLO (aka VIMO)," Sep. 16, 2018, YouTube video, <https://www.youtube.com/watch?v=oUFOzG5Bm4A>.

(Continued)

*Primary Examiner* — Mishawn N. Hunter
(74) *Attorney, Agent, or Firm* — Sheppard Mullin Richter & Hampton LLP

(57) ABSTRACT

Systems and methods for adding virtual audio stickers to videos are disclosed. In general, one aspect disclosed features a method, comprising: editing a video to create an edited video, the editing comprising: playing a video in a video panel of a display screen of an electronic device, while the video is playing in the video panel, receiving user input at a particular time in the video, wherein the user input includes a touch at a particular location in the video panel, and responsive to the user input, adding a virtual audio sticker to the video, wherein the virtual audio sticker comprises: an image, and an audio clip.

20 Claims, 10 Drawing Sheets

(56) References Cited

U.S. PATENT DOCUMENTS

| | | | |
|---|---|---|---|
| 2019/0096113 A1* | 3/2019 | Stukalov | G06T 13/00 |
| 2019/0187880 A1* | 6/2019 | Dalonzo | G06F 3/04842 |
| 2020/0028922 A1* | 1/2020 | Bravo Avina | H04L 67/306 |
| 2020/0074738 A1* | 3/2020 | Hare | G06T 19/006 |

OTHER PUBLICATIONS

"How to Add Stickers to Video," Sep. 29, 2019, retreived online at <https://beecut.com/add-stickers-video.html>.
Green, Daniel, "App for journalists: InShot, for creating distinctive social media posts," Journalism.co.uk, Oct. 3, 2019, retrieved online at <https://www.journalism.co.uk/news/app-for-journalists-inshot-for-creating-distinctive-social-media-posts/s2/a745425/>.
International Search Report and Written Opinion in PCT/US2020/058443, dated Feb. 18, 2021.

* cited by examiner

1300

```
Virtual Audio Sticker Properties

- fixed properties 1302
  -- ID properties 1306
  -- image file 1308
  -- audio file 1310

- variable properties 1304
  -- start drag position 1312
  -- stop drag position 1314
  -- active/inactive flag 1316
  -- triggered flag 1318
  -- size 1320
  -- rotation 1322
  -- animation 1324
```

FIG. 13

SYSTEM AND METHOD FOR ADDING VIRTUAL AUDIO STICKERS TO VIDEOS

DESCRIPTION OF RELATED ART

The present disclosure relates generally to video editing.

SUMMARY

In general, one aspect disclosed features a system, comprising: a hardware processor; and a non-transitory machine-readable storage medium encoded with instructions executable by the hardware processor to perform a method comprising: editing a video to create an edited video, the editing comprising: playing a video in a video panel of a display screen of an electronic device, while the video is playing in the video panel, receiving user input at a particular time in the video, wherein the user input includes a touch at a particular location in the video panel, and responsive to the user input, adding a virtual audio sticker to the video, wherein the virtual audio sticker comprises: an image, and an audio clip.

Embodiments of the system may include one or more of the following features. Some embodiments comprise playing the edited video, comprising: displaying the image starting at the particular time in the video, wherein the image is superimposed over the video at the particular location in the video panel, and playing the audio clip starting at the particular time in the video. In some embodiments, playing the edited video further comprises: removing the image from the video responsive to the audio clip concluding. In some embodiments, the method further comprising one of: playing the audio clip instead of an audio track of the video; or playing the audio clip and the audio track of the video. In some embodiments, editing the video further comprises: receiving additional user input, at a second particular time in the video; and responsive to the additional user input, removing the virtual audio sticker from the video at the second particular time in the video. In some embodiments, editing the video further comprises: displaying the virtual audio sticker, and a plurality of other virtual audio stickers, in a virtual audio sticker panel of the display screen, wherein the user input comprises an additional touch at a location of the virtual audio sticker in the virtual audio sticker panel; and responsive to the additional touch at the location of the virtual audio sticker, selecting the virtual audio sticker. In some embodiments, editing the video further comprises: playing the audio clip of the virtual audio sticker responsive to the virtual audio sticker being selected.

In general, one aspect disclosed features a non-transitory machine-readable storage medium encoded with instructions executable by a hardware processor of a computing component, the machine-readable storage medium comprising instructions to cause the hardware processor to perform a method comprising: editing a video to create an edited video, the editing comprising: playing a video in a video panel of a display screen of an electronic device, while the video is playing in the video panel, receiving user input at a particular time in the video, wherein the user input includes a touch at a particular location in the video panel, and responsive to the user input, adding a virtual audio sticker to the video, wherein the virtual audio sticker comprises: an image, and an audio clip.

Embodiments of the medium may include one or more of the following features. In some embodiments, the method further comprises: playing the edited video, comprising: displaying the image starting at the particular time in the video, wherein the image is superimposed over the video at the particular location in the video panel, and playing the audio clip starting at the particular time in the video. In some embodiments, playing the edited video further comprises: removing the image from the video responsive to the audio clip concluding. In some embodiments, the method further comprises one of: playing the audio clip instead of an audio track of the video; or playing the audio clip and the audio track of the video. In some embodiments, editing the video further comprises: receiving additional user input at a second particular time in the video; and responsive to the additional user input, removing the virtual audio sticker from the video at the second particular time in the video. In some embodiments, editing the video further comprises: displaying the virtual audio sticker, and a plurality of other virtual audio stickers, in a virtual audio sticker panel of the display screen, wherein the user input comprises an additional touch at a location of the virtual audio sticker in the virtual audio sticker panel; and responsive to the additional touch at the location of the virtual audio sticker, selecting the virtual audio sticker. In some embodiments, editing the video further comprises: playing the audio clip of the virtual audio sticker responsive to the virtual audio sticker being selected.

In general, one aspect disclosed features a method, comprising: editing a video to create an edited video, the editing comprising: playing a video in a video panel of a display screen of an electronic device, while the video is playing in the video panel, receiving user input at a particular time in the video, wherein the user input includes a touch at a particular location in the video panel, and responsive to the user input, adding a virtual audio sticker to the video, wherein the virtual audio sticker comprises: an image, and an audio clip.

Embodiments of the method may include one or more of the following features. Some embodiments comprise playing the edited video, comprising: displaying the image starting at the particular time in the video, wherein the image is superimposed over the video at the particular location in the video panel, and playing the audio clip starting at the particular time in the video. Some embodiments comprise playing the edited video further comprises: removing the image from the video responsive to the audio clip concluding. Some embodiments comprise playing the audio clip instead of an audio track of the video; or playing the audio clip and the audio track of the video. In some embodiments, editing the video further comprises: receiving additional user input, at a second particular time in the video; and responsive to the additional user input, removing the virtual audio sticker from the video at the second particular time in the video. In some embodiments, editing the video further comprises: displaying the virtual audio sticker, and a plurality of other virtual audio stickers, in a virtual audio sticker panel of the display screen, wherein the user input comprises an additional touch at a location of the virtual audio sticker in the virtual audio sticker panel; and responsive to the additional touch at the location of the virtual audio sticker, selecting the virtual audio sticker.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 13 shows example properties of a virtual audio sticker, according to some embodiments of the disclosed technologies.

Figure 1:
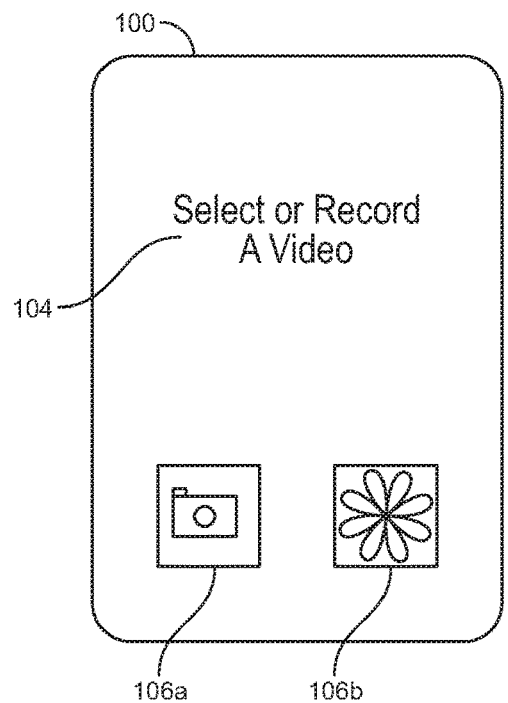
FIG. 1 illustrates an initial display that may be displayed on a display screen at the beginning of the video editing process, according to embodiments of the disclosed technology.

The figures are not exhaustive and do not limit the present disclosure to the precise form disclosed.

DETAILED DESCRIPTION

Video sharing is an increasingly popular form of virtual interaction, as evidenced by the recent emergence and spread of content such as gifs, memes, and related features on social media platforms. And people are constantly looking for ways to make their content more entertaining, for example by adding accessories to their videos.

One type of video accessory is the virtual sticker. A virtual sticker is a graphical image that can be superimposed over some or all of a video. Any sort of image may be used, for example including drawings, cartoon images, photographs, videos, and the like. One type of virtual sticker is the virtual audio sticker, which includes both a graphical image and an audio clip. A virtual audio sticker may be added to the video at a selected time in the video, and at a selected location in the video display. When the edited video is played, and reaches the selected time, the graphical image is shown at the selected location, and the audio clip plays.

While virtual audio stickers have proven to be quite popular, the tools currently available for adding virtual audio stickers to videos are generally complex, expensive, and/or cumbersome. In particular, these tools generally generate and display a video timeline along with the video during the editing process. To add a virtual audio sticker to a video, the user is required to manipulate the video timeline, for example, to select a particular frame in the video. While the video is paused at the selected video frame, the user may add the virtual audio sticker to the video track and may add the audio clip to the audio track of the video. The complexity of such tools requires expert knowledge, and substantial time, to accomplish the process of adding a virtual audio sticker to a short video for sharing with friends. This complexity constitutes a barrier to entry that is high enough to discourage many users from enjoying these delightful ways of expressing themselves and entertaining their friends.

Embodiments of the disclosed technology solve the problems described above, by providing a lightweight video editing tool that is straightforward and quick to use. In some embodiments, the tool allows the user to add a virtual audio sticker to a video while the video is playing, and without the use of a timeline. According to these embodiments, the user drags the virtual audio sticker on to the display of the video at a time and location of her choosing. In some embodiments, the video loops continuously. As the video loops, the user may continue editing the video. For example, the user may drag the virtual audio sticker to a different time or location in the video. As another example, the user may remove the virtual audio sticker from the video at a particular time, thereby defining the duration of the virtual audio sticker. In other embodiments, a virtual audio sticker may automatically disappear once its audio clip has concluded.

In some embodiments, the audio clip of the virtual audio sticker may replace the audio track of the video. In other embodiments, the audio clip and the audio track may play together. In some embodiments, the audio level of the audio track of the video may be reduced while the audio clip of the virtual audio sticker plays. In still other embodiments, the virtual audio sticker may include an audio effect that modifies the audio of the video. For example, the audio effect may cause a voice in the video to echo, sound robotic, and the like.

In some embodiments, a collection of predefined virtual audio stickers may be displayed in an audio sticker panel. In some embodiments, a user may listen to the audio clip of a virtual audio sticker in the virtual audio sticker panel by simply selecting (e.g., touching) that virtual audio sticker. Users may define their own custom virtual audio stickers by pairing images and audio clips, both of which may be predefined or supplied by the user.

These features provide a video editing tool that is straightforward and easy to use. By eliminating the use of a video editing timeline, the tool reduces the complexity and knowledge required to operate the tool. And by allowing the user to edit the video while it is playing, the tool reduces the time required to edit a video.

FIGS. 1-9 illustrate displays that may be produced by an electronic device while editing a video to add a virtual audio sticker and while playing the edited video, according to embodiments of the disclosed technology. The electronic device may be implemented as any device capable of performing these processes and having a display screen capable of producing these displays. For example, the electronic device may be implemented as a smart phone, a tablet, a laptop computer, a desktop computer, and the like. In the described embodiments, the electronic device is described as having a touchscreen, and user inputs are described as gestures. However, it should be understood that with electronic devices not having touchscreens, the described user inputs may be provided using other input/output devices, for example including mice, trackballs, touchpads, joysticks, keyboards, and the like.

FIG. 1 illustrates an initial display 100 that may be displayed on a display screen 102 at the beginning of the video editing process, according to embodiments of the disclosed technology. Referring to FIG. 1, the display 100 may include a message 104 such as "Select Or Record A Video" that prompts the user to select a video for editing. The display 100 may also include a plurality of icons 106a and 106b. The camera icon 106a may be selected to record a new video for immediate editing. The flower icon 106b may be selected to select a previously-recorded video for editing. The previously-recorded videos may include not only videos recorded by the electronic device, but also videos shared by friends, and the like. But while a particular arrangement of messages 104 and icons 106 is shown in FIG. 1, it should be understood that any suitable arrangement of these and/or other display elements may be employed.

Figure 2:
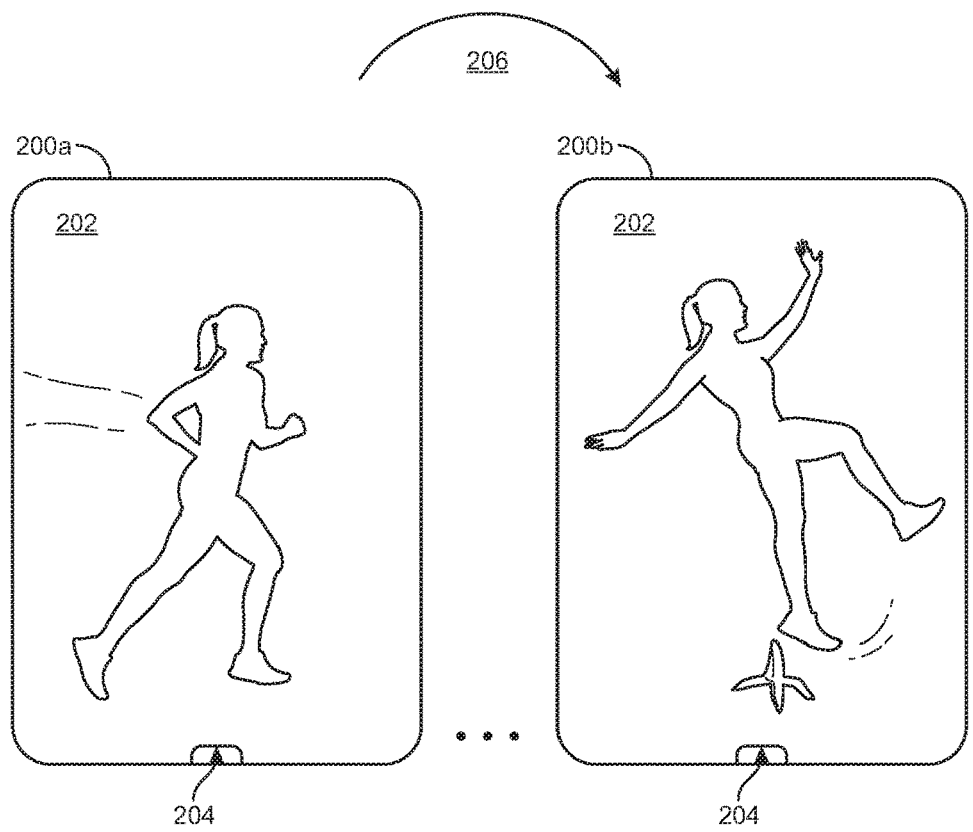
FIG. 2 illustrates two displays that may be generated while editing the selected video, according to embodiments of the disclosed technology.

FIG. 2 illustrates two displays 200a and 200b that may be generated while editing the selected video, according to embodiments of the disclosed technology. In the example of FIG. 2, the video depicts a person running in the display 200a, and then slipping on a banana peel in the display 200b. The video is played in a video panel 202. Notably, no video timeline is shown or needed. The video is automatically repeated, for example in a looping mode by automatically replaying the video from the beginning upon reaching its end, as illustrated generally by the arrows at 206. The displays 200 may include a sticker tab 204 that may be selected to expose one or more virtual audio stickers.

Figure 3:
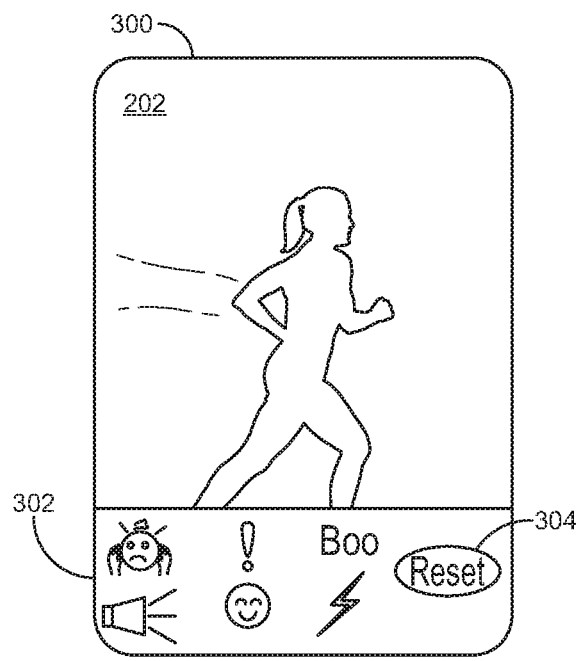
FIG. 3 illustrates a display that may be generated when a user operates the sticker tab 204, according to embodiments of the disclosed technology.

FIG. 3 illustrates a display 300 that may be generated when a user operates the sticker tab 204, according to embodiments of the disclosed technology. For example, when using a smart phone to edit the video, a user may swipe up the sticker tab 204. In response to this gesture, a sticker panel 302 may be displayed. The sticker panel 302 may be displayed as translucent, such that the video can be seen through the sticker panel.

The sticker panel 302 may include a library of virtual audio stickers, for example as shown in FIG. 3. The library of virtual audio stickers may include virtual audio stickers included with the video editing tool, as well as virtual audio stickers created by the user. Some embodiments may feature access to a networked library where the user may share her virtual audio stickers, and obtain virtual audio stickers created by others. In some embodiments, the sticker panel 302 may include a "Reset" button 304 that, when touched, removes all the virtual audio stickers added by the user, thereby restoring the video to its original state.

Figure 4:
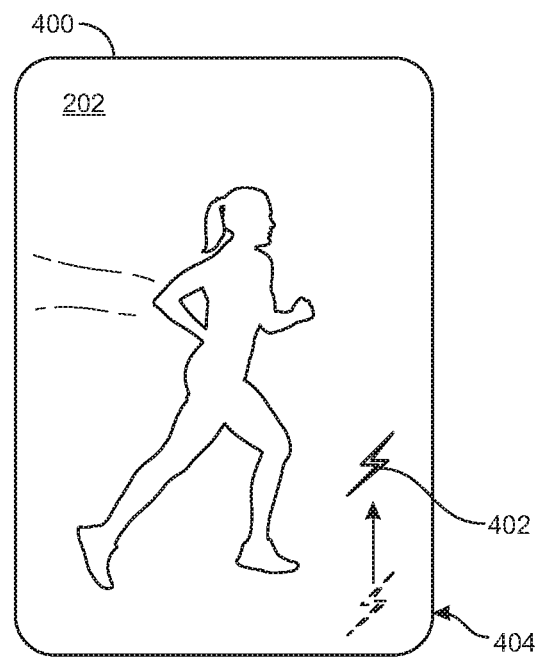
FIG. 4 illustrates a display that may be generated while user is adding a virtual audio sticker to the video, according to embodiments of the disclosed technology.

FIG. 4 illustrates a display 400 that may be generated while a user is adding a virtual audio sticker to the video, according to embodiments of the disclosed technology. In this example, the user has selected a virtual audio sticker 402 having a lightning bolt image, and has moved that sticker 402 to a selected location in the display 400, as shown generally at 404. In some embodiments, this editing may take place while the video is playing. In such embodiments, the user may select the start time and display location of a virtual audio sticker with a single gesture. For example, the gesture may be a simple swipe up (or drag and drop), as in the example of FIG. 4. In some embodiments, the sticker panel 302 may remain visible and translucent while adding a virtual audio sticker. In other embodiments, while adding a virtual audio sticker, the sticker panel 302 may become even more translucent, or may disappear entirely as shown in FIG. 4, for example to facilitate placement of the virtual audio sticker in parts of the video that might otherwise be somewhat obscured by the sticker panel 302. In other embodiments, the size of the video may be reduced while adding a virtual audio sticker so that the video is shown above the sticker panel 302.

Figure 5:
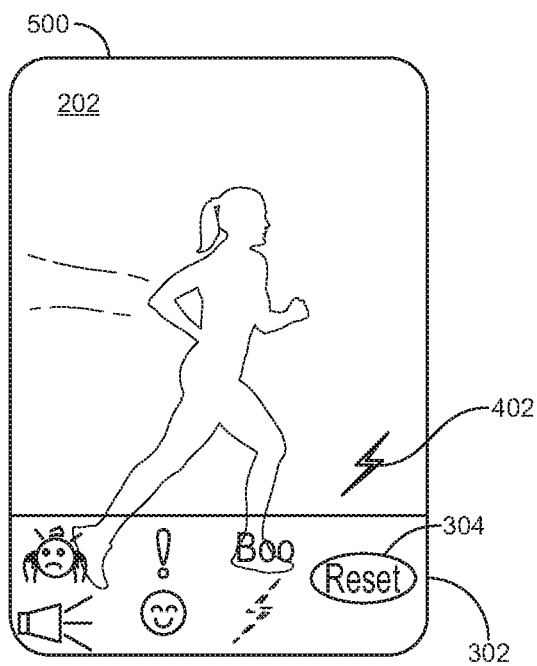
FIG. 5 illustrates a display that may be generated while the edited video is playing, according to embodiments of the disclosed technology.

FIG. 5 illustrates a display 500 that may be generated while the edited video is playing, according to embodiments of the disclosed technology. In particular, the display 500 illustrates the edited video at the moment the virtual audio sticker 402 was added to the video. At that moment, the virtual audio sticker 402 appears at the selected location, and its audio clip begins to play. For example, the audio clip may include a sad trombone sound. In this example, the virtual audio sticker 402 enhances the video by foreshadowing an interesting development.

Figure 6:
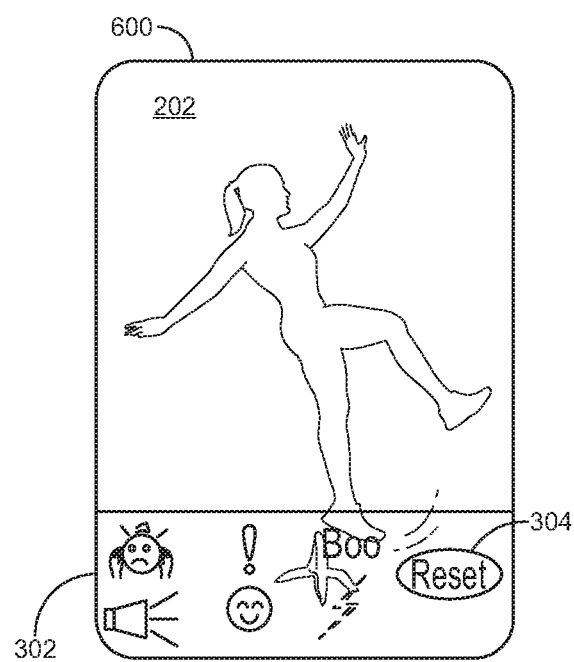
FIG. 6 illustrates a display that may be generated subsequent to the display of FIG. 5 while the edited video is playing, according to embodiments of the disclosed technology.

FIG. 6 illustrates a display 600 that may be generated subsequent to the display 500 of FIG. 5 while the edited video is playing, according to embodiments of the disclosed technology. In particular, the display 600 of FIG. 6 illustrates the edited video at the moment the audio clip of the virtual audio sticker 402 concludes. In the depicted embodiment, when that audio clip concludes, the virtual audio sticker 402 is automatically removed. However, in other embodiments, other techniques may be used to remove the virtual audio sticker 402.

In the examples of FIGS. 5 and 6, the sticker panel 302 remains visible and translucent, so the user may add further virtual audio stickers to the video. In other embodiments, the sticker panel 302 may be minimized after adding a virtual audio sticker. In such embodiments, the sticker tab 204 of FIG. 2 may appear while the sticker panel 302 is minimized, and the user may open the sticker panel again by selecting the sticker tab 204.

Figure 7:
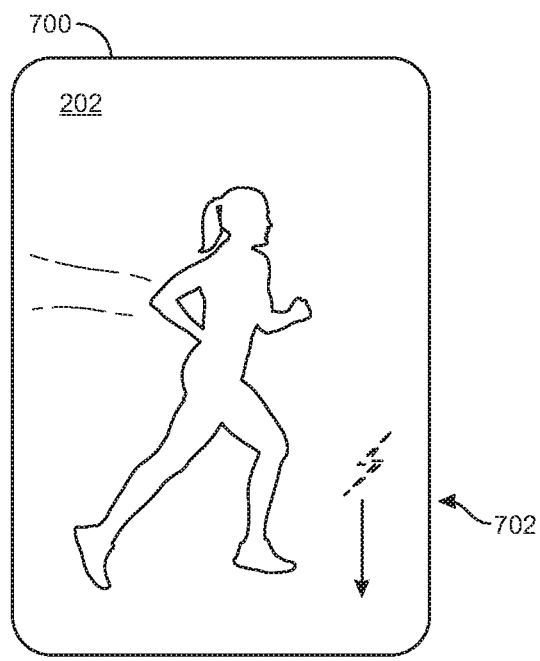
FIG. 7 illustrates a display that may be generated during editing of the video, according to embodiments of the disclosed technology.

FIG. 7 illustrates a display 700 that may be generated during editing of the video, according to embodiments of the disclosed technology. In this example, the user removes the virtual audio sticker 402 manually, as shown generally at 702. In some embodiments, this editing may take place while the video is playing. In such embodiments, the user may select the time for removal of a virtual audio sticker with a single gesture. For example, the gesture may be a swipe down, as shown in FIG. 7. However, it should be understood that other gestures may be used to manually remove a virtual audio sticker from a video.

In some embodiments, the sticker panel 302 may remain visible and translucent while removing or editing a virtual audio sticker. In other embodiments, while removing or editing a virtual audio sticker, the sticker panel 302 may become even more translucent, or may disappear entirely as shown in FIG. 7. In other embodiments, the size of the video may be reduced while removing or editing a virtual audio sticker so that the video is shown above the sticker panel 302.

Figure 8:
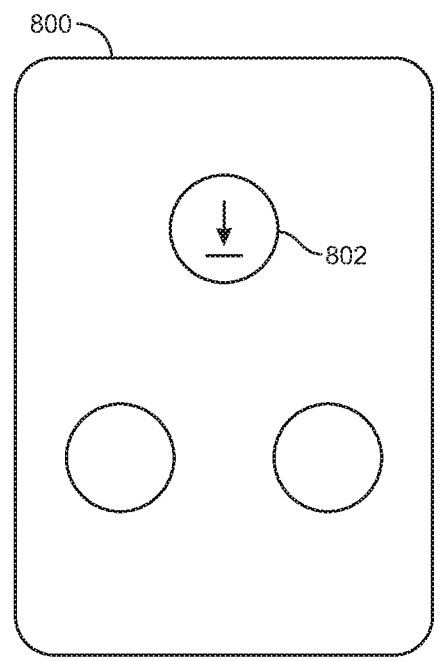
FIG. 8 illustrates a display that may be generated during sharing of an edited video, according to embodiments of the disclosed technology.

FIG. 8 illustrates a display 800 that may be generated during sharing of an edited video, according to embodiments of the disclosed technology. Referring to FIG. 8, the display 800 may include a plurality of icons representing different ways of sharing the edited video. In the example of FIG. 8, the icons include a download icon 802 that may be selected to download the edited video to local storage of the electronic device. However, any sharing method may be employed. For example, the sharing methods may include posting the edited video to a social media site, transferring the edited video directly to one or more other users, for example by text message or email, and the like.

Figure 9:
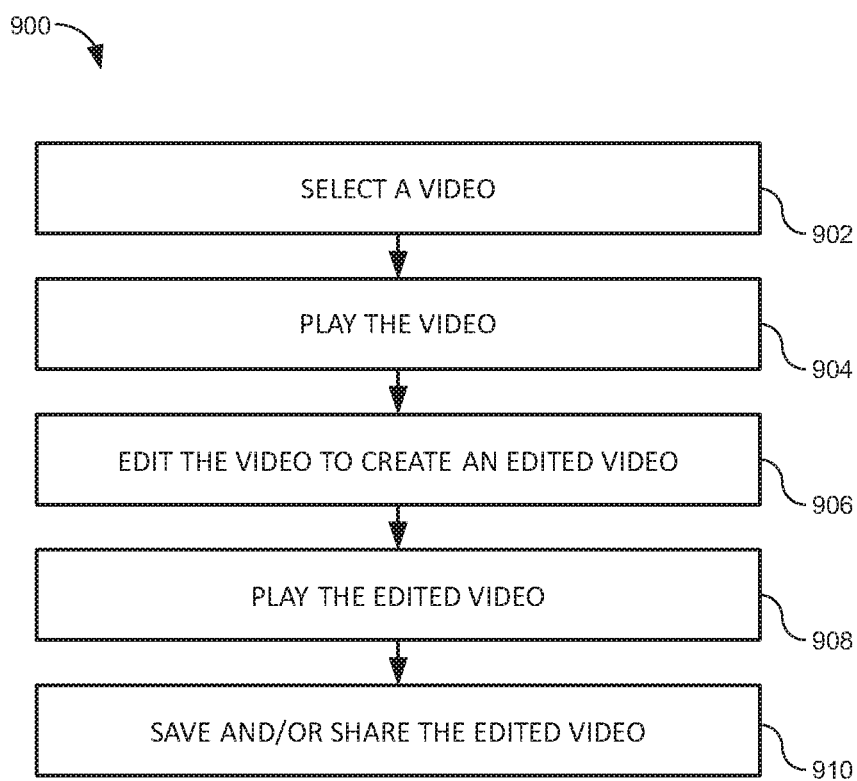
FIG. 9 illustrates a process that may be performed while editing, playing, and sharing a video, according to embodiments of the disclosed technology.
Figure 10:
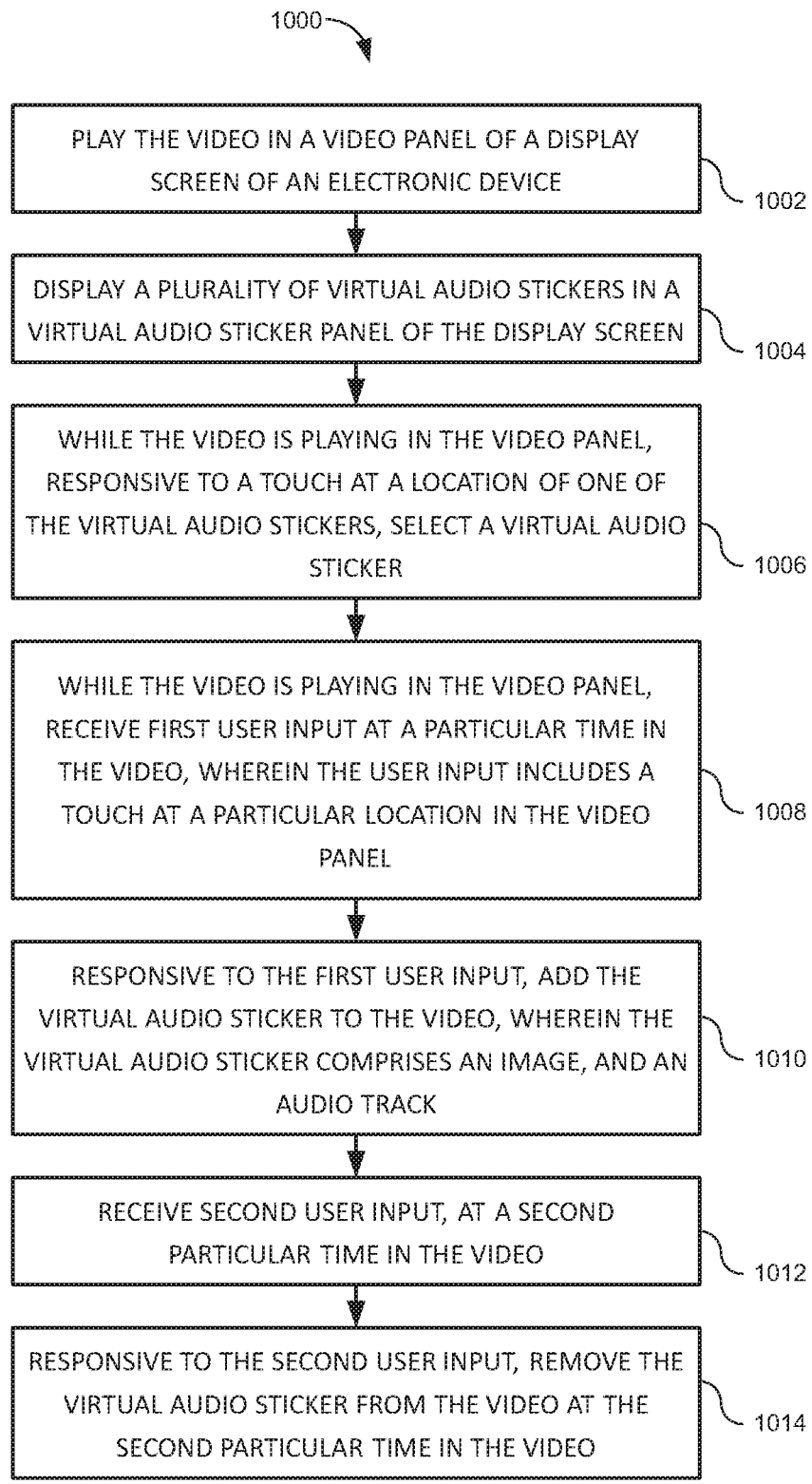
FIG. 10 illustrates a process for editing a video to add a virtual audio sticker, according to embodiments of the disclosed technology.
Figure 11:
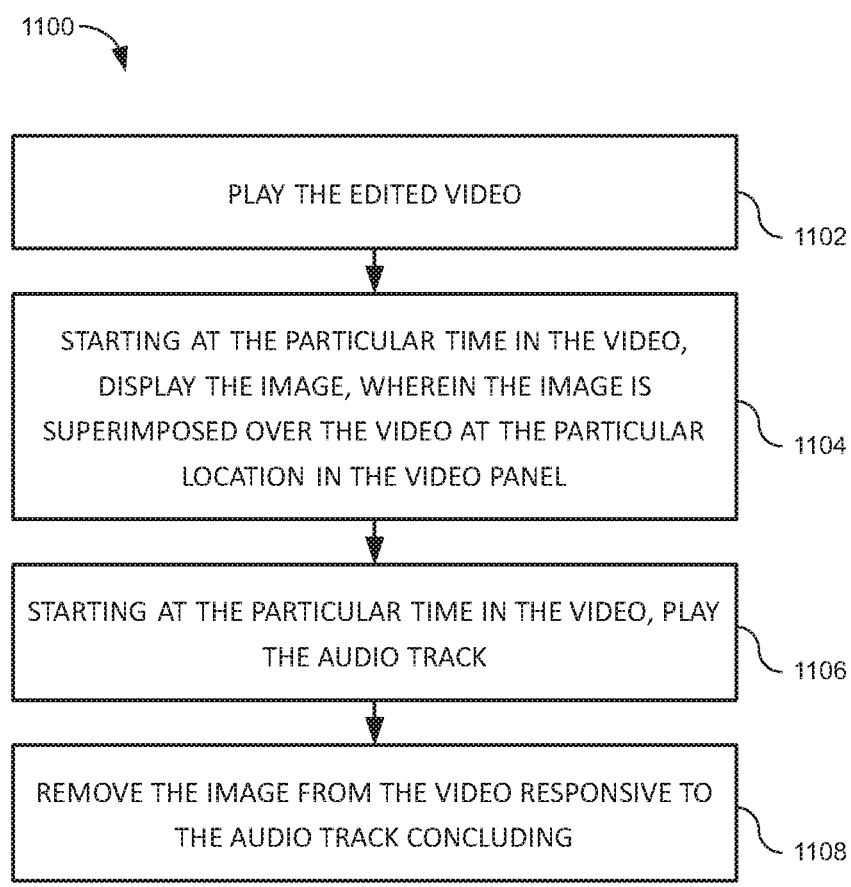
FIG. 11 illustrates a process for playing a video that has been edited to include a virtual audio sticker, according to embodiments of the disclosed technology.

FIGS. 9-11 illustrate processes according to embodiments of the disclosed technology. While in the disclosed embodiments, elements of these processes are depicted and described in a particular sequence, it should be appreciated that various process elements may be performed in other sequences, may be performed in parallel, may be omitted, and combinations thereof. Furthermore, various process elements may be performed locally by the electronic device, may be performed remotely from the electronic device, for example in a cloud computing system, and may be performed by combinations of these techniques.

FIG. 9 illustrates a process 900 that may be performed while editing, playing, and sharing a video, according to embodiments of the disclosed technology. Referring to FIG. 9, the process 900 may begin with selecting or recording a video for editing, at 902. For example, referring to FIG. 1, a user may select or record a video for editing by selecting a corresponding icon 106 in a video selection display 100.

Referring again to FIG. 9, responsive to the selection of a video, the video may play, at 904. For example, referring again to FIG. 1, the video may be played in a video panel 202 of an electronic device. In some embodiments, the video may be played in a repeating mode. Any repeating mode may be used. For example, the video may be played in a loop such as a forward loop or a reverse loop. In another example, the video may be played in a "boomerang" mode where the video plays forward, then in reverse, then forward, and so on.

Referring again to FIG. 9, the user may edit the video to create an edited video, at 906, as described in detail below with reference to FIG. 10. The user may then play the edited video, at 908, as described in detail below with reference to FIG. 11. The user may also save and/or share the edited video, at 910. For example, referring again to FIG. 8, the user may download the edited video by selecting the download icon 802 in the display 800.

FIG. 10 illustrates a process 1000 for editing a video by adding a virtual audio sticker, according to embodiments of the disclosed technology. Referring to FIG. 10, the process 1000 may include playing the video in a video panel of a display screen of an electronic device, at 1002. For example, referring to FIG. 2, the video may be played in a repeating mode, for example as described above.

Referring again to FIG. 10, the process 1000 may include displaying a plurality of virtual audio stickers in a virtual audio sticker panel of the display screen, at 1004. For example, referring to FIG. 3, the virtual audio sticker panel 302 may be displayed responsive to the user selecting the sticker tab 204. In some embodiments, the virtual audio sticker panel 302 may contain more virtual audio stickers than can be shown at once. In such embodiments, a user may scroll the virtual audio sticker panel 302 to reveal additional virtual audio stickers.

Referring again to FIG. 10, the process 1000 may include selecting one of the virtual audio stickers, responsive to a touch at a location of one of the virtual audio stickers shown in the virtual audio sticker panel, while the video is playing in the video panel, at 1006. In some embodiments, responsive to selection of one of the virtual audio stickers, the audio clip associated with that virtual audio sticker may be played. For example, a user may tap a particular virtual audio sticker to hear its audio clip. In this manner, a user may choose a virtual audio sticker according to its audio clip.

Referring again to FIG. 10, the process 1000 may include receiving first user input at a particular time in the video, while the video is playing in the video panel. The user input may include a touch at a particular location in the video panel, at 1008. For example, referring to FIG. 4, the touch may be part of the gesture used to select the virtual audio sticker, such as the swipe up gesture illustrated generally at 404. In another example, the touch may be separate from the touch used to select the virtual audio sticker. That is, the user may tap the virtual audio sticker 402 in the virtual audio sticker panel 302 to select that virtual audio sticker 402, and then may tap the location in the video panel to place the virtual audio sticker 402 in the video. However, any gesture or combination of gestures may be used to select and place a virtual audio sticker in a video.

Referring again to FIG. 10, the process 1000 may include adding the selected virtual audio sticker to the video responsive to the first user input, at 1010. For example, referring again to FIG. 5, responsive to the first user input, a virtual audio sticker 402 has been added to the video. In particular, the virtual audio sticker 402 has been added to the video at a time and place indicated by the user input. As noted above, each virtual audio sticker comprises an image and an audio clip.

In some embodiments, a user may choose the time at which the virtual audio sticker is removed from the video. Referring again to FIG. 10, the process 1000 may include receiving second user input at a second particular time in the video, at 1012, and responsive to the second user input, removing the virtual audio sticker from the video at the second particular time in the video, at 1014. For example, referring again to FIG. 7, a user input causes the virtual audio sticker 402 previously added to the video to be removed from the video. In the example of FIG. 7, the user input is a swipe down gesture. However, any gesture may be employed. For example, the user may remove a virtual audio sticker from a video by simply tapping the virtual audio sticker once.

In some embodiments, a virtual audio sticker is removed from the video at the time the user input begins. For example, in the case of a swipe down gesture, the virtual audio sticker may be removed from the video at the time the gesture begins. In other embodiments, a virtual audio sticker may be removed from the video at the time the user input ends. For example, in the case of a touch gesture, the virtual audio sticker may be removed from the video when the user lifts her finger from the display. Other gestures, gesture timings, and combinations thereof are contemplated.

In some embodiments, various effects may be selected for adding and/or removing the image of the virtual audio sticker. For example, the image may fade in, fade out, expand, shrink, pop, or the like. These features may be selected, for example by applying a long-press gesture to the virtual audio sticker after it has been added to the video.

In some embodiments, various effects may be selected for display of the image associated with the virtual audio sticker. For example, at any time during the display of the image, a user may apply a wiggle gesture to the image, thereby causing the image to wiggle during that time. As another example, a user may change the size of the image, for example by using a two-finger zoom-in or zoom-out gesture. A user may make these changes while adding the audio sticker to the video or after adding the audio sticker to the video.

Embodiments of the disclosed technology are not limited to two-dimensional videos or two-dimensional images for the virtual audio stickers. For example, the techniques described above may be implemented in a virtual-reality or augmented-reality environment. In such embodiments, the images associated with the virtual audio stickers may be implemented as three-dimensional objects.

In some embodiments, a user may control play of the audio clip independently of the duration of the image. For example, the user may cause the audio to fade in, fade out, start late, end early, and the like. The user may control play of the audio clip while adding the virtual audio sticker to the video, or after adding the virtual audio sticker to video. For example, the user may employ a three-finger zoom-in or zoom-out gesture to alter the audio clip.

In some embodiments, a user may select the manner in which the image associated with the virtual audio sticker is removed from the video. For example, a user may tap the virtual audio sticker to cause the image to simply disappear. As another example, the user may swipe the virtual audio sticker off the display to cause the image to slide off the display panel, following the path of the swipe. In some embodiments, a user may reposition the virtual audio sticker so that the image will change positions, move around in the video, and the like, when the edited video is played. For example, referring again to FIG. 6, the user may cause the image to follow the person prior to slipping on the banana peel, to move towards the banana peel, to circle the banana peel, and the like. Similar techniques may be applied to select the manner in which the image associated with the virtual audio sticker is added to the video.

FIG. 11 illustrates a process 1100 for playing a video that has been edited to include a virtual audio sticker, according to embodiments of the disclosed technology. Referring to FIG. 11, the process 1100 may include playing the video in a video panel of a display screen of an electronic device, at 1002. For example, referring again to FIG. 2, the video may be played in a repeating mode, for example as described above.

As noted above, the virtual audio sticker includes an image and audio clip. Referring again to FIG. 11, the process 1100 may include displaying the image, at 1104, and playing the audio clip, at 1106, both starting at the starting time selected by the user who edited the video. For example, referring to FIG. 5, the image associated with the virtual audio sticker 402 appears just before the person slips on the banana peel. The audio clip associated with the virtual audio sticker 402 begins to play at the same time.

Referring again to FIG. 11, the process 1100 may include removing the image associated with the audio sticker from the video responsive to the audio clip associated with the audio sticker concluding. For example, referring again to FIG. 6, the image associated with the virtual audio sticker 402 disappears when the associated audio clip concludes, as the person slips on the banana peel.

But as noted above, a user may manually remove a virtual audio sticker. In some embodiments, the user may allow the audio clip to continue playing after the virtual audio sticker is removed. In some embodiments, a user may stop play of the audio clip when the virtual audio sticker is removed. In some embodiments, a user may choose one of these options by using an appropriate gesture for removal of the virtual audio sticker. For example, a user may swipe right on the image of the virtual audio sticker to stop the audio clip when the image is removed, and may swipe left to allow the audio clip to continue playing after the images is removed.

In some embodiments, the timing and/or placement of an audio sticker may be selected automatically by the tool. For example, the tool may include a "censorship" feature that scans the audio of the video, and on detecting certain keywords in that audio, automatically adds a virtual audio sticker to the video. In some embodiments, this feature may identify the speaker of the keyword, and may automatically place the image of the virtual audio sticker on the image of the speaker in the video. For example, the image may include the word "censored," and may be placed so as to obscure the mouth of the speaker. The audio clip may be a "bleep" sound, followed by sprinkled then robust applause.

This feature may time the audio clip to completely obscure the keyword in the audio, or may obscure only a portion of the keyword in the audio, for example obscuring only a middle portion of the keyword, while allowing the initial and terminal portions of the keyword to be heard. This feature may be used to censor naughty words so the video may be enjoyed by a younger audience. This feature may also be used to censor common words so they appear to be naughty words to entertain adults.

In some embodiments, the feature may automatically choose the timing of the virtual audio sticker according to visual elements in the video. For example, the feature may be employed to locate the visual element of a person sticking her tongue out, and to automatically place the virtual audio sticker in the video at the time that visual element appears. The user may assign particular virtual audio stickers to particular visual elements. For example, on detecting the visual element of the person sticking her tongue out, the feature may automatically place a virtual audio sticker including the word "brat" in the video.

In some embodiments, the feature may choose the timing of the virtual audio sticker according to visual and audio elements in the video. For example, on detecting the visual and audio elements of a person sticking her tongue out while also screaming, the feature may automatically place a virtual audio sticker of a screaming goat in the video.

In some embodiments, one or more of the virtual audio stickers may be interactive for viewers of edited videos. For example, an edited video may include a virtual audio sticker having an image that is visible, but an audio track that only plays once the viewer taps the image. In this example, the video may show an image of a screaming goat while a person is screaming while sticking her tongue out, but may only play the sound of the screaming goat once the viewer taps the image.

Figure 12:
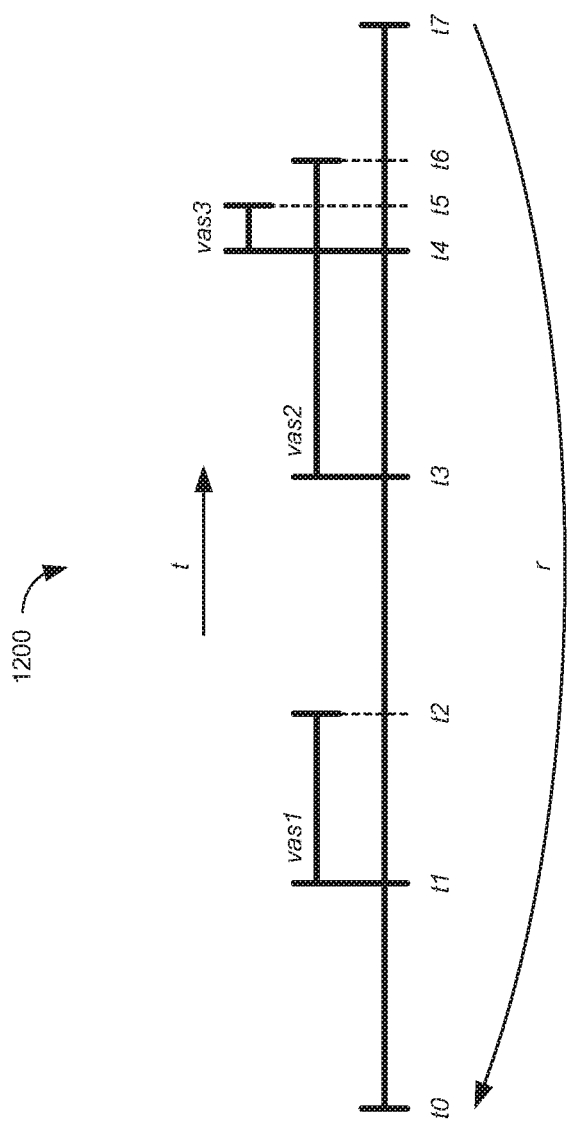
FIG. 12 illustrates an internal timeline, according to embodiments of the disclosed technology.

As noted above, the disclosed embodiments do not display a video timeline to the user, and no timeline is needed to edit the video. However, the tool may maintain an internal timeline to record the timings associated with the audio stickers. FIG. 12 illustrates an internal timeline 1200, according to embodiments of the disclosed technology. Referring to FIG. 12, time progresses from left to right, as shown generally at t. And as noted above, the video may repeat, as shown generally at r.

In some embodiments, a video may be edited to include multiple virtual audio stickers, and two or more of the virtual audio stickers may overlap in time. In the example of FIG. 12, the video represented by timeline 1200 includes three virtual audio stickers vas1, vas2, and vas3. The video begins at time W. The first virtual audio sticker vas1 plays first, beginning at time t1 and concluding at time t2. The second virtual audio sticker vas2 plays next, beginning at time t3 and concluding at time t6. The third virtual audio sticker vas3 starts last, beginning at time t4 and concluding at time t5. The video ends at time t7. But as noted above, the video may repeat, for example in any one of a number of repeating notes that may be selected by a user.

In some embodiments, the video editing tool may generate the edited video by rendering the timeline 1200 of FIG. 12. In other embodiments, the disclosed video editing tool may generate the edited video by simply recording the screen of the electronic device. In still other embodiments, the video editing tool may generate the edited video in other ways.

FIG. 13 shows example properties 1300 of a virtual audio sticker, according to some embodiments of the disclosed technologies. Referring to FIG. 13, the example properties 1300 may include both fixed properties 1302 and variable properties 1304. For example, the fixed properties 1302 may include an ID 1306, an image file 1308, and an audio file 1310. The ID 1306 may be a text string for internal use by the tool in referring to particular virtual audio stickers. The image file 1308 and audio file 1310 may be represented by pointers to files for the image and audio clip of the virtual audio sticker.

The variable properties 1304 may include properties that change when the virtual audio sticker is used. For example, the variable properties 1304 may include a start drag position 1312 that indicates the position in the display where a drag gesture started. When the start drag position 1312 is in the virtual audio sticker panel, the tool may infer that the user is adding the virtual audio sticker to a video. When the start drag position 1312 is in the video panel, the tool may infer that the user is either removing the audio sticker from the video, or moving the sticker to a new position in the video.

The variable properties 1304 may include a stop drag position 1314 that indicates the position in the display where a drag gesture has ended. When the stop drag position 1314 is in the video panel, the tool may infer that the user has added the virtual audio sticker to the video, or has repositioned the virtual audio sticker in the video. When the stop drag position 1314 is in the virtual audio sticker panel, the tool may infer that the user has removed the virtual audio sticker from the video.

The variable properties 1304 may include an active/inactive flag 1316 that indicates whether the virtual audio sticker is currently part of the video being edited. For example, if the flag 1316 is true, then the virtual audio sticker is part of the video being edited.

The variable properties 1304 may include a triggered flag 1318 that indicates whether the virtual audio sticker is currently playing in the video being edited. For example, in the display 500 of FIG. 5, the triggered flag 1318 would be true because the virtual audio sticker is currently playing the video.

The variable properties 1304 may include a size property 1320 that indicates a size of the image associated with the virtual audio sticker. For example, the size property 1320 may indicate the height and width of the image.

The variable properties 1304 may include a rotation property 1322 that indicates an angle of rotation of the image associated with the virtual audio sticker. The variable properties 1304 may include an animation property 1324 that describes animation characteristics of the image associated with the virtual audio sticker.

These virtual audio sticker properties 1300 are described only by way of example, and not by way of limitation. In some embodiments, one or more of the properties 1300 may be omitted. In some embodiments, other properties may be included.

Figure 14:
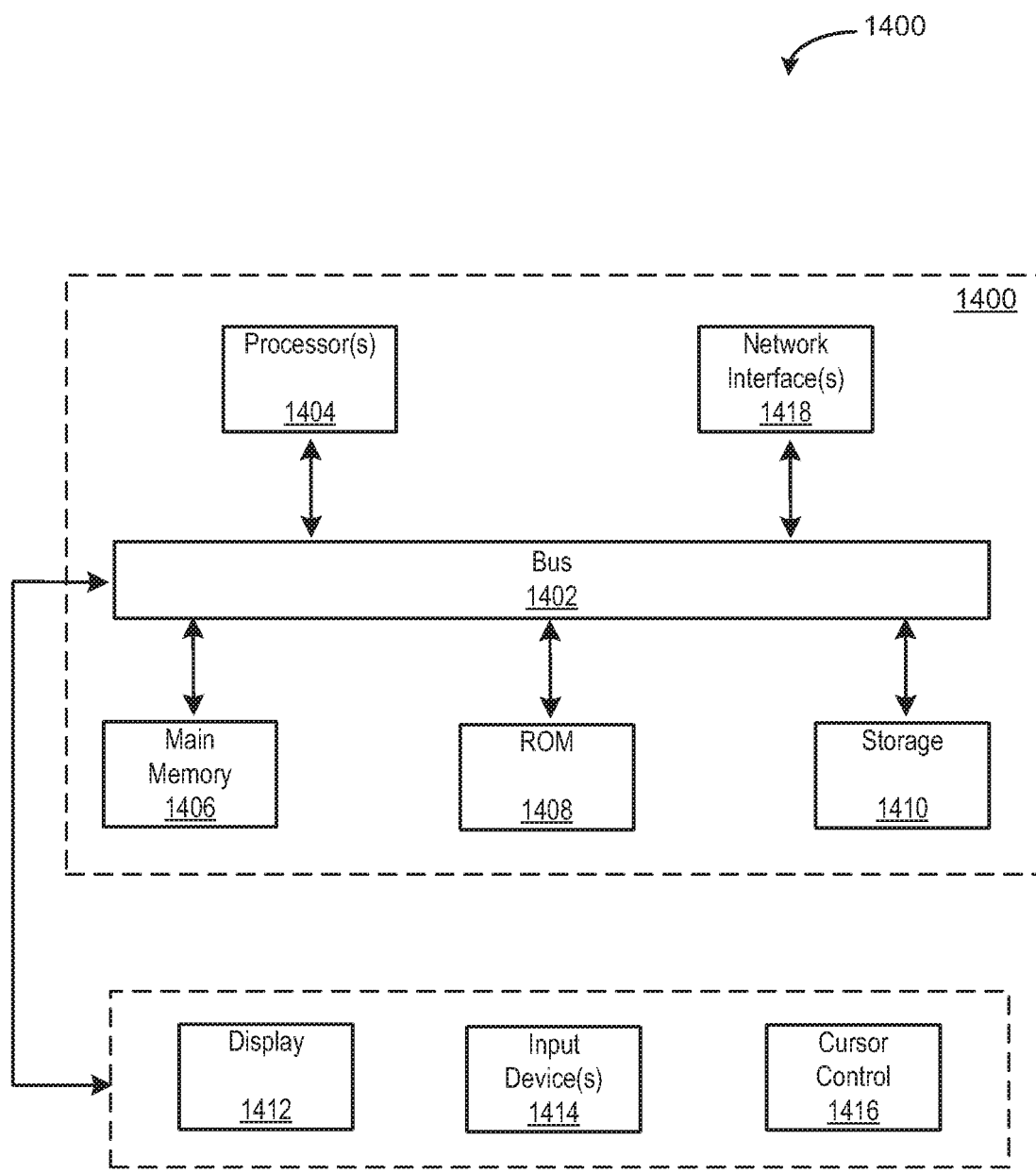
FIG. 14 depicts a block diagram of an example computer system in which various of the embodiments described herein may be implemented.

FIG. 14 depicts a block diagram of an example computer system 1400 in which various of the embodiments described herein may be implemented. The computer system 1400 includes a bus 1402 or other communication mechanism for communicating information, and one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions. In particular, the instructions may implement the disclosed video editing tool.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a liquid crystal display (LCD) (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. In some embodiments, the same direction information and command selections as cursor control may be implemented via receiving touches on a touch screen without a cursor.

The computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 1402. Transmission media can also take the form of acoustic or light waves, such as those generated during radio-wave and infra-red data communications.

The computer system 1400 also includes a communication interface 1418 coupled to bus 1402. Network interface 1418 provides a two-way data communication mechanism coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, network interface 1418 may be a local area network (LAN) card to provide a data communication connection to a compatible LAN (or WAN component to communicated with a WAN). Wireless links may also be implemented. In any such implementation, network interface 1418 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic, or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network(s), network link and communication interface 1418. In the Internet example, a server might transmit a requested code for an application program through the Internet, the ISP, the local network and the communication interface 1418.

The received code may be executed by processor 1404 as it is received and/or stored in storage device 1410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain methods or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In some implementations, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a hardware processor; and
a non-transitory machine-readable storage medium encoded with instructions executable by the hardware processor to perform a method comprising:
editing a video to create an edited video, the editing comprising:
playing a video in a video panel of a display screen of an electronic device,
while the video is playing in the video panel, receiving user input at a particular time in the video, wherein the user input includes only a single gesture ending at a particular location in the video panel, and
responsive to the user input, selecting a virtual audio sticker and adding the virtual audio sticker to the video at the particular location in the video panel, wherein the virtual audio sticker comprises:
an image, and
an audio clip.

2. The system of claim 1, the method further comprising:
playing the edited video, comprising:
displaying the image starting at the particular time in the video, wherein the image is superimposed over the video at the particular location in the video panel, and
playing the audio clip starting at the particular time in the video.

3. The system of claim 2, wherein playing the edited video further comprises:
removing the image from the video responsive to the audio clip concluding.

4. The system of claim 2, the method further comprising one of:
playing the audio clip instead of an audio track of the video; or
playing the audio clip and the audio track of the video.

5. The system of claim 1, wherein editing the video further comprises:
receiving additional user input, at a second particular time in the video; and
responsive to the additional user input, removing the virtual audio sticker from the video at the second particular time in the video.

6. The system of claim 1, wherein editing the video further comprises:
displaying the virtual audio sticker, and a plurality of other virtual audio stickers, in a virtual audio sticker panel of the display screen, wherein the single gesture begins at a location of the virtual audio sticker in the virtual audio sticker panel.

7. The system of claim 6, wherein editing the video further comprises:
playing the audio clip of the virtual audio sticker responsive to the virtual audio sticker being selected.

8. A non-transitory machine-readable storage medium encoded with instructions executable by a hardware processor of a computing component, the machine-readable storage medium comprising instructions to cause the hardware processor to perform a method comprising:
editing a video to create an edited video, the editing comprising:
playing a video in a video panel of a display screen of an electronic device,
while the video is playing in the video panel, receiving user input at a particular time in the video, wherein the user input includes only a single gesture ending at a particular location in the video panel, and
responsive to the user input, selecting a virtual audio sticker and adding the virtual audio sticker to the video at the particular location in the video panel, wherein the virtual audio sticker comprises:
an image, and
an audio clip.

9. The medium of claim 8, the method further comprising:
playing the edited video, comprising:
displaying the image starting at the particular time in the video, wherein the image is superimposed over the video at the particular location in the video panel, and
playing the audio clip starting at the particular time in the video.

10. The medium of claim 9, wherein playing the edited video further comprises:
removing the image from the video responsive to the audio clip concluding.

11. The medium of claim 9, the method further comprising one of:
playing the audio clip instead of an audio track of the video; or
playing the audio clip and the audio track of the video.

12. The medium of claim 8, wherein editing the video further comprises:
receiving additional user input at a second particular time in the video; and
responsive to the additional user input, removing the virtual audio sticker from the video at the second particular time in the video.

13. The medium of claim 8, wherein editing the video further comprises:
displaying the virtual audio sticker, and a plurality of other virtual audio stickers, in a virtual audio sticker panel of the display screen, wherein the single gesture begins at a location of the virtual audio sticker in the virtual audio sticker panel.

14. The medium of claim 13, wherein editing the video further comprises:
playing the audio clip of the virtual audio sticker responsive to the virtual audio sticker being selected.

15. A method, comprising:
editing a video to create an edited video, the editing comprising:

playing a video in a video panel of a display screen of an electronic device, while the video is playing in the video panel, receiving user input at a particular time in the video, wherein the user input includes only a single gesture ending at a particular location in the video panel, and responsive to the user input, selecting a virtual audio sticker and adding the virtual audio sticker to the video at the particular location in the video panel, wherein the virtual audio sticker comprises:
an image, and
an audio clip.

16. The method of claim 15, further comprising:
playing the edited video, comprising:
displaying the image starting at the particular time in the video, wherein the image is superimposed over the video at the particular location in the video panel, and
playing the audio clip starting at the particular time in the video.

17. The method of claim 16, wherein playing the edited video further comprises:
removing the image from the video responsive to the audio clip concluding.

18. The method of claim 16, further comprising one of:
playing the audio clip instead of an audio track of the video; or
playing the audio clip and the audio track of the video.

19. The method of claim 15, wherein editing the video further comprises:
receiving additional user input, at a second particular time in the video; and
responsive to the additional user input, removing the virtual audio sticker from the video at the second particular time in the video.

20. The method of claim 15, wherein editing the video further comprises:
displaying the virtual audio sticker, and a plurality of other virtual audio stickers, in a virtual audio sticker panel of the display screen, wherein the single gesture begins at a location of the virtual audio sticker in the virtual audio sticker panel.

* * * * *